(12) United States Patent
Roley

(10) Patent No.: US 6,822,347 B2
(45) Date of Patent: Nov. 23, 2004

(54) SERVICE CONTROL FOR WORK MACHINE

(75) Inventor: Robert D. Roley, Windsor, IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 10/243,006

(22) Filed: Sep. 13, 2002

(65) Prior Publication Data

US 2004/0050677 A1 Mar. 18, 2004

(51) Int. Cl.$^7$ .................. B60R 21/00; H01H 9/00; B60L 3/00
(52) U.S. Cl. .................. 307/112; 200/61.58 R; 200/334; 180/271; 307/9.1
(58) Field of Search .................. 200/52 R, 334, 200/61.58 R; 180/315–336, 78, 271–290; 307/9.1, 10.1–10.8, 112–125

(56) References Cited

U.S. PATENT DOCUMENTS

| | | | |
|---|---|---|---|
| 4,538,036 A | 8/1985 | Heinrich et al. | |
| 4,851,951 A | 7/1989 | Foster, Jr. | |
| 5,128,551 A * | 7/1992 | Clokie | 307/10.1 |
| 5,481,139 A * | 1/1996 | Lucas | 307/9.1 |
| 5,810,183 A * | 9/1998 | Feider et al. | 212/291 |
| 5,984,241 A | 11/1999 | Sparks | |
| 6,282,070 B1 | 8/2001 | Ziegler et al. | |
| 6,385,732 B1 | 5/2002 | Eckel et al. | |
| 6,422,330 B1 * | 7/2002 | Harris | 180/65.1 |

* cited by examiner

*Primary Examiner*—James R. Scott

(57) ABSTRACT

The present invention provides a method and apparatus for selectively enabling or disabling a plurality of machine systems of a work machine. A service control box is provided on the work machine at a position accessible to a service technician. The service control box includes a battery disconnect switch and at least one service mode control switch. The service control switch is adapted to enable at least one machine system for the purpose of performing a service procedure on that machine system. A keypad may be used as a service control switch and be adapted to enable or disable a plurality of various machine systems. The service control switch may be adapted to be used from locations on the work machine that are remote from the service control box.

19 Claims, 4 Drawing Sheets

SERVICE CONTROL FOR WORK MACHINE

TECHNICAL FIELD

This invention relates generally to an off-highway work machine, and more specifically to a service control box for enabling or disabling specific machine systems for the purpose of performing service procedures.

BACKGROUND

Work machines, such as off-highway trucks, tractors, wheel loaders and the like, typically utilize a battery disconnect switch to electrically isolate electrical components during service procedures. The disconnect switch is typically turned to an "off" position for servicing and turned to an "on" position for operation of the work machine. The battery disconnect switch prevents operation of the machine by those who may be unaware that service procedures are being performed. For example, if a service technician is changing the engine lubricating oil, the battery disconnect switch is turned to the "off" position, preventing operation of the engine, which would cause catastrophic engine damage.

U.S. Pat. No. 4,538,036 teaches a battery disconnect switch for use with a work machine. Disconnect switches of this nature are often located in a box having a lock arrangement. The box is typically mounted in a position that permits easy access by the service technician. The service technician turns the disconnect switch to the "off" position and locks the box. After service procedures have been completed, the service technician unlocks the box and turns the battery disconnect to the "on" position.

Modern machines incorporate numerous machine systems the are controlled by an electronic controller. A typical battery disconnect switch disables the electronic controller and all of machine systems. One example of a machine system that requires battery power during the service procedure is an automatic evacuation oil system.

Engines of many large machines hold large quantities of lubricating oil, often in excess of one hundred gallons. When the oil requires changing, it is extremely time consuming to drain the used engine oil into a pan and later transfer the used oil to a drum. The automatic evacuation system includes an electric pump, fluidly coupled to the engine sump. The pump is permanently mounted on the machine and configured to be attached to a used oil tank. The pump moves the used oil from the sump to the tank. During removal of oil from the engine, it is desirable to have the battery disconnect in the "off" position, preventing accidental operation of the engine, but this also disables the pump. It is also desirable to disable the automatic evacuation system during normal operation of the machine, preventing accidental discharge of the engine oil.

Numerous other machine systems provide similar difficulties during servicing, it would be beneficial to have a control system for selectively enabling and disabling these systems.

The present invention is directed to overcoming one or more of the above-identified problems.

SUMMARY OF THE INVENTION

A method for servicing a work machine having a control system having a plurality of input devices, an electronic controller and a plurality of machine systems being controlled by the electronic controller. The method including the steps of accessing a service control box and moving a service control switch to a service control position, wherein moving said service control switch to said service control position causes at least one of said machine systems to be deactivated and at least one machine control system to be activated.

DETAILED DESCRIPTION

Figure 1:
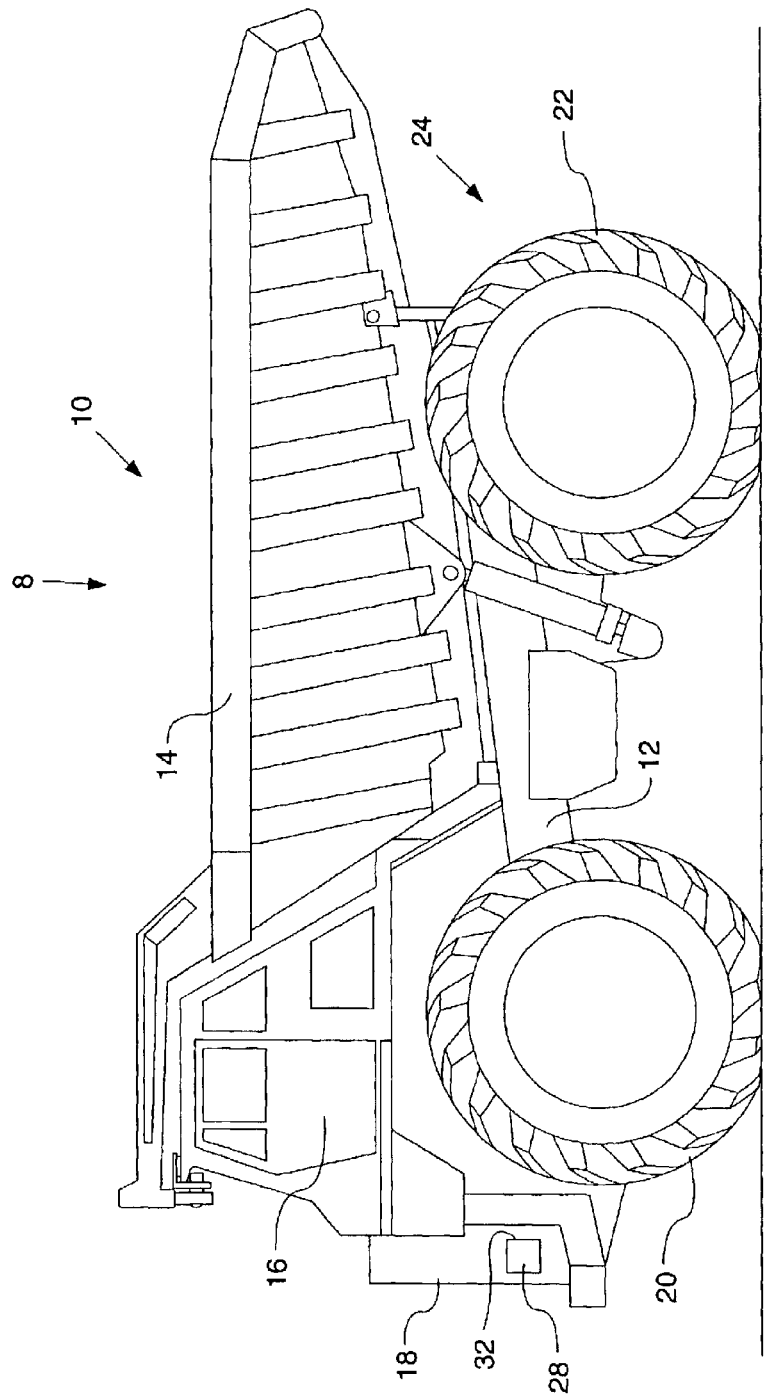
FIG. 1 is a side elevational view of a work machine with which this invention may be used.

Referring to FIG. 1, a work machine 8, such as an off-highway truck 10 employing the present invention is illustrated. The truck 10 comprises a frame 12, and a dump body 14 pivotally mounted to the frame 12. An operator cab 16 is mounted on the front of the frame 12 above an engine enclosure 18. The truck 10 is supported on the ground by a pair of front tires 20 (one shown), and a pair of driven rear tires 22 (one shown) at the rear. As well known in the art, one or more engines (not shown) are housed within the engine enclosure 18. The engine is used to provide power to a final drive assembly 24, via a mechanical or electric drive train. A service control box 28 is positioned on the machine 8 in a location accessible to a service technician. The service control box 28 contains at least one service control switch 30. The service control box 28 includes a lock apparatus 32 to permit the box 28 to be closed and locked by a service technician, thereby preventing unauthorized access to the inside of the box 28. As illustrated the lock apparatus 32 is a hasp 34 (shown in FIGS. 3 & 4) adapted to receive a pad lock (not shown).

Figure 2:
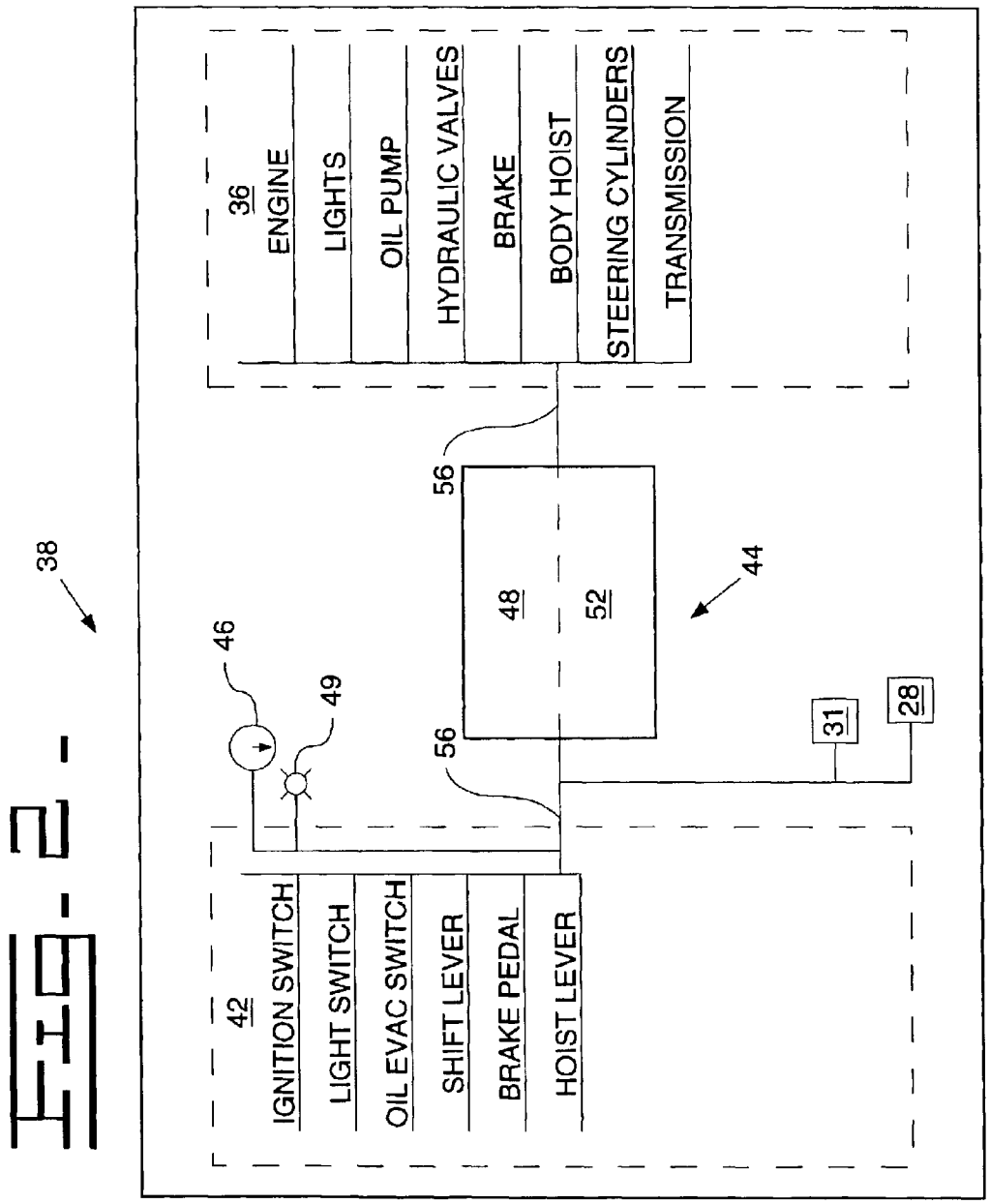
FIG. 2 is schematic representation of a control system for a work machine.

Referring now to FIG. 2, a control system 38 for operating a plurality of machine systems 36 is schematically illustrated. The control system 38 includes a plurality of input devices 42, an electronic controller 44 and monitoring devices 46. The electronic controller 44 includes a processor 48 and a database 52 for storing a plurality of electronic instructions to be used by the processor 48. The machine systems 36 are preferably connected to the control system 38 by a wiring harness 56. The input devices 42 may include, but are not limited to, ignition switch, light switches, oil evacuation switch, shifting lever, brake pedal, and body hoist lever. The service control box 28 interfaces the wiring harness 56 between the input devices 42 and the electronic controller 44. A remote service control switch 31 may be adapted to temporally connect to the wiring harness 56 at a location other than the service control box 28. The remote service control switch 31 is preferably made available only to the service technician. The electronic controller 44 receives input signals from the input devices 42 and in-turn sends a control signal 58 to the appropriate machine system 36, causing activation or deactivation of the related machine system 36. Examples of machine systems 36 include, but are not limited to, a hydraulic steering system, lights, transmission, brakes, body dump, oil evacuation, lights, horn, hydraulic system and various engine controls. The monitoring devices 46 include a one or more gages 47 and indicators 66 mounted within the operator's cab 16 in a conventional manner. The various machine systems 36 are well known in the art and will not be discussed in further detail.

Figure 3:
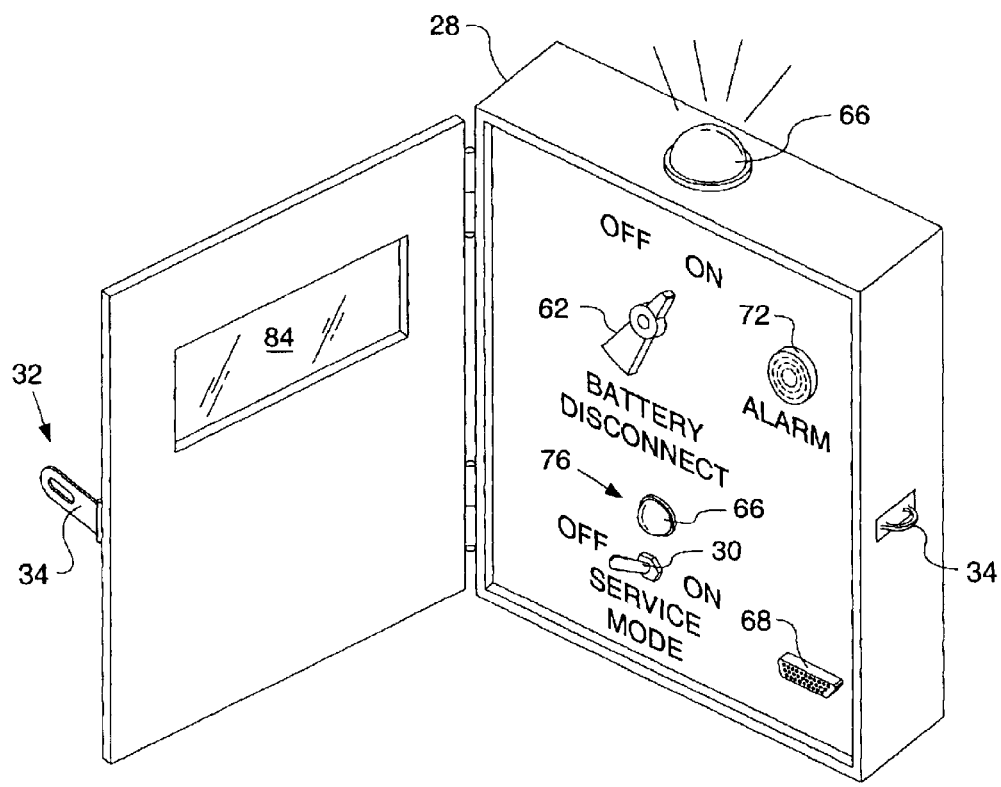
FIG. 3 an illustration of one embodiment of a service control box of the present invention.

Referring now to FIG. 3, one embodiment of the service control box 28 is illustrated. The service control box 28 includes a battery disconnect switch 62, at least one service control switch 30 and a service mode indicator 66. The service mode indicator 66 may be mounted inside or outside of the service control box 28. Additionally, a data port 68 and an audible alarm 72 may be provided in the service control box 28 or at some other convenient location, such as in the operator cab 16. The battery disconnect switch 62 is adapted to electrically isolate the control system 38. In one example, the service control switch 30 is adapted to provide electrical power to an oil evacuation system. It should be noted, the service control switch 30 can be adapted to control any combination of the machine systems 36. The service mode indicator 66 is preferably a light 76 and is illuminated when the service mode switch 66 is in the "on" position.

When the machine 8 is in a service mode, a plurality of machine systems 36 may be adapted to be turned "on" or "off". For example, having the battery switch 62 in the "on" position and the service mode switch 64 in the "on" position may cause a parking brake 76 to be applied, a transmission 78 to be held in a neutral gear, the steering system 82 will be turned off, the service mode indicator 66 to be turned on, the engine prevented from running and the oil evacuation system 74 turned on.

Alternate of the service mode indicator 66, a transparent panel 84 may be disposed in a door of the service control box 28. The transparent panel 84 is positioned to allow visual inspection of the inside of the locked service control box 28. The data port 68 is adapted to be connected to an electronic monitoring device, such as a portable computer (not shown). The data port 68 is used to transfer data, or electronic instructions, to and from the electronic controller 44. The electronic data may include any of a plurality of parameters related to the machine systems 36, such as engine oil pressure or number of hours of operation of the engine. Additional electronic data may include events recorded by the electronic controller 44. The events may include attempts to activate any of the machine systems 36 and the time of the events. The audible alarm 72 may be housed within the service control box 28, or may be mounted remotely at a predetermined location such as the operator cab 16. Alternately, the audible alarm 72 may configured to use an existing device as an audible alarm 72. Examples of existing devices that may be used as an audible alarm 72 include a horn (not shown) or a radio speaker (not shown). The audible alarm 72 may be adapted to give a plurality of different warnings related to specific service functions being performed. Examples of different warnings include, two short blasts of the horn 88 when the service control switch 30 is turned to the "on" position and three long blasts when turned to the "off" position. Additionally, the service control box 28 may activate the audible alarm 72 in relation to an unauthorized person attempting to operate the machine 8 when the service mode switch 64 is in the "on" position.

Figure 4:
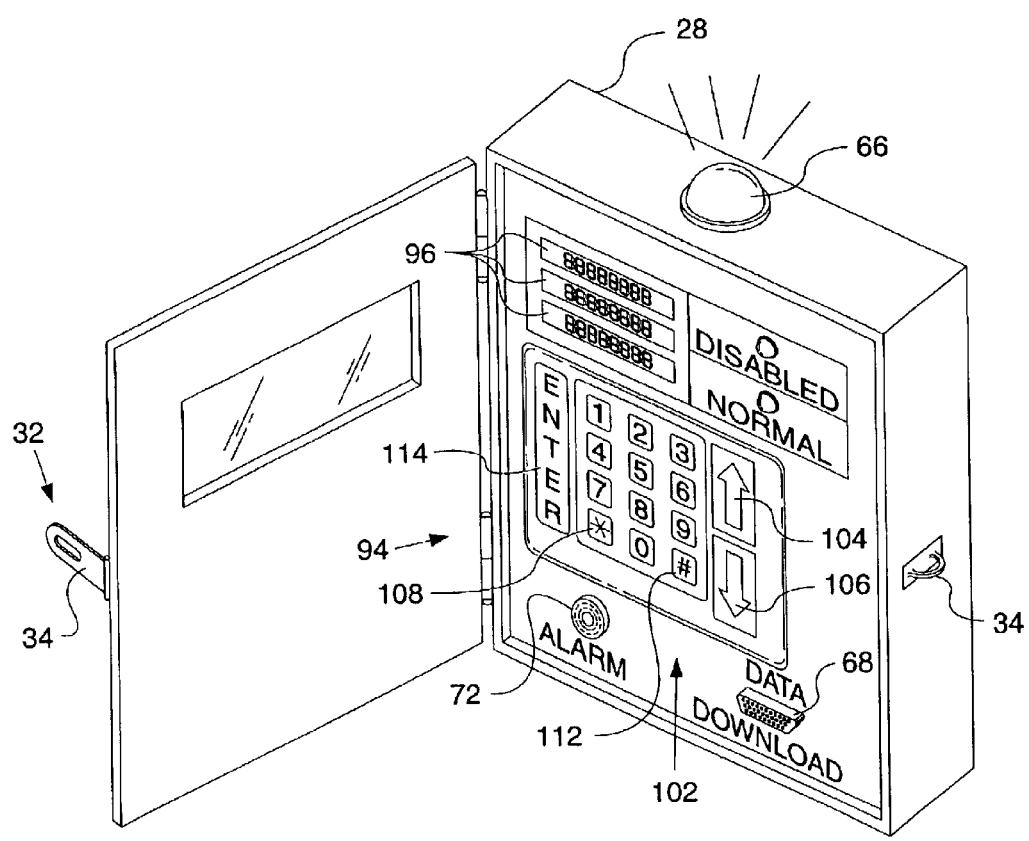
FIG. 4 is an illustration of another embodiment of the service control box of the present invention.

Referring now to FIG. 4, an alternate embodiment of the service control box 28 of the present invention is illustrated. The service control box 28 includes a keypad 94, a digital display 96, a data port 68 and an audible alarm 72. The service control box 28 may additionally include one or more service mode indicators 66 and a printed instructions or listing of codes 98 related to service procedures.

The keypad 94 as illustrated includes a plurality of numeric keys 102, an up arrow key 104, a down arrow key 106, an asterisk key 108, a pound key 112 and an enter key 114. It should be noted, that the exact configuration of the keypad 94 can be varied without deviating from the scope of the present invention. The keypad 94 is adapted to act as a multi-functional service control switch 30 for the service control box 28. The electronic controller 44 may be programmed to recognize different combinations of keypad 94 inputs as different service modes, thereby activating or deactivating various machine systems 36 as related to a specific service procedure. The remote service control switch 31 may additionally be provided as a keypad 94.

The digital display 96 is adapted to display information related to the current status of the control system 38. For example, "Normal Run" may be displayed when the control system 38 is fully enabled. An unlimited number of different messages may be displayed, related to various service procedures. Additionally, the digital display 96 may be used to relay service instructions to the service technician.

Industrial Applicability

In operation the present invention provides a method and apparatus for selectively enabling or disabling selected machine systems 36. In one example, the control box 28 of FIG. 3 is set up to activate the an oil evacuation mode. The service technician approaches the parked work machine 8, and accesses the service control box 28. Leaving the battery disconnect switch 62 in the "on" position, the service technician turns the service control switch 30 to the "on" position. The electronic controller 44 then maintains the machine systems 36 in the following states; the oil evacuation pump is energized, the parking brakes remain engaged preventing the machine 8 from moving, the transmission is held in neutral regardless of the position of the shift lever, the steering system is disabled, an indicator 66 is illuminated in the operator cab 16 informing the operator the normal operation has been disabled. It should be noted, additional machine systems 36 that may be programmed to be enabled or disabled using the service control switch 30, including engine run, dump body hoist and back-up steering system.

In another aspect of the present invention, using the service control box 28 of FIG. 4, it is possible for the service technician to control any machine system 36 that is controlled by the electronic controller 44. For example, the service technician can open the control box 28 to access the keypad 94. By selecting an appropriate key, such as up arrow 104, the digital display 96 can scroll through a list of service modes, such as "disconnect battery". Once the desired service mode is displayed, an alternate key may be depressed to activate or deactivate that specific machine system. For example, the up arrow key 104 may be repeatedly depressed until "battery disconnect" is displayed on the digital display 96, the "asterisk" key 108 could then be depressed to disconnect the battery from the control system 38. To reconnect the battery, the up arrow key 104 would be depressed until the digital display 96 reads "battery disconnected", upon depressing the "pound" key 112 the battery would be connected to the control system 38. Additional individual machine systems 36 can be activated or deactivated is the same manner, regardless of the status of the battery disconnect.

What is claimed is:

1. A service control for a work machine comprising:
   a battery switch being adapted to electrically isolate a plurality of machine systems; and
   a service control switch being adapted to selectively engage or disengage at least one of said plurality of machine systems in response to said battery switch being engaged.

2. The service control of claim 1, wherein said service control switch is a keypad.

3. The service control of claim 1, including a service mode indicator disposed in at least one of an operator cab and said service control box.

4. The service control of claim 3, wherein said service mode indicator is a digital display.

5. The service control of claim 1, including an audible alarm disposed in at least one of said operator cab and said service control box.

6. The service control of claim 5, wherein said audible alarm is at least one of a machine horn and a radio speaker.

7. The service control of claim 1, including a data port disposed in at least one of said service control, operator cab and an engine enclosure.

8. The service control of claim 7, wherein said data port is adapted to transmit or receive electronic data related to a plurality of machine system operating parameters.

9. The service control of claim 1, including a remote service control switch adapted to interface a control system of a work machine at a location different than said service control.

10. A method for servicing a work machine, said work machine including a control system having a plurality of input devices, an electronic controller and a plurality of machine systems being controlled by said electronic controller, said method comprising the steps of:

accessing a service control box;

moving a battery switch to a service position, wherein moving said battery switch to said service position electrically isolates a plurality of machine control systems; and moving a service control switch to a service control position, wherein moving said service control switch to said service control position causes at least one of said machine control system to be activated.

11. The method of claim 10, including the step of locking said service control box after the step of moving said service control switch.

12. The method of claim 10, including the step of observing a service mode indicator to verify that said work machine is in a service control mode.

13. The method of claim 10, including a step of sounding an audible alarm to indicate that said work machine is in a service control mode.

14. The method of claim 13, including the step of sounding a horn.

15. The method of claim 13 including a step of sounding a radio speaker.

16. The method of claim 10 including a step of depressing a keypad to put said work machine in said service mode.

17. The method of claim 10 including a step of receiving electronic data from said electronic controller.

18. The method of claim 10 including a step of transmitting electronic instructions to said electronic controller.

19. The method of claim 10 including a step of using a remote service control switch to one of transmit and receive said electronic data.

* * * * *